(12) United States Patent
Staffanou

(10) Patent No.: US 8,497,770 B2
(45) Date of Patent: Jul. 30, 2013

(54) LOW PROFILE FLEXIBLE LIGHT BAR TACHOMETER

(76) Inventor: Matthew Stevens Staffanou, Petaluma, CA (US)

( * ) Notice: Subject to any disclaimer, the term of this patent is extended or adjusted under 35 U.S.C. 154(b) by 370 days.

(21) Appl. No.: 13/015,535

(22) Filed: Jan. 27, 2011

(65) Prior Publication Data

US 2012/0025967 A1    Feb. 2, 2012

Related U.S. Application Data

(60) Provisional application No. 61/299,898, filed on Jan. 29, 2010.

(51) Int. Cl.
*B60Q 1/00* (2006.01)
*G01L 3/26* (2006.01)

(52) U.S. Cl.
USPC ........ 340/441; 340/461; 340/815.4; 362/488; 362/489; 73/114.24; 73/114.25

(58) Field of Classification Search
USPC ........ 340/441, 461, 815.4; 701/1; 116/46–54; 73/114.24, 114.25; 362/488, 489; 345/30, 345/31, 55, 108
See application file for complete search history.

(56) References Cited

U.S. PATENT DOCUMENTS

| | | | | |
|---|---|---|---|---|
| 3,757,128 A * | 9/1973 | Vermeulen | | 250/231.16 |
| 3,797,605 A * | 3/1974 | Letzel et al. | | 180/90 |
| 3,855,572 A * | 12/1974 | Olson | | 340/441 |
| 4,882,659 A * | 11/1989 | Gloudemans | | 362/511 |
| 5,406,303 A * | 4/1995 | Salmon et al. | | 345/75.1 |
| 5,656,992 A * | 8/1997 | McNeill | | 340/441 |
| 5,825,338 A * | 10/1998 | Salmon et al. | | 345/7 |
| 6,499,852 B1 * | 12/2002 | Kino et al. | | 362/23 |
| 6,882,289 B2 * | 4/2005 | Motsenbocker | | 340/984 |
| 7,236,089 B2 * | 6/2007 | Ono et al. | | 340/461 |
| 7,249,874 B2 * | 7/2007 | Kuhl | | 362/494 |
| 7,369,044 B2 * | 5/2008 | Ono et al. | | 340/461 |
| 7,501,939 B1 * | 3/2009 | Belikov et al. | | 340/438 |
| 7,598,849 B2 * | 10/2009 | Gallant et al. | | 340/441 |
| 2004/0104816 A1 * | 6/2004 | Wilson | | 340/438 |
| 2008/0018488 A1 * | 1/2008 | Struck et al. | | 340/815.86 |
| 2008/0049437 A1 * | 2/2008 | Takayama et al. | | 362/490 |
| 2008/0211652 A1 * | 9/2008 | Cope et al. | | 340/461 |
| 2008/0211653 A1 * | 9/2008 | Cope | | 340/461 |
| 2009/0278677 A1 * | 11/2009 | Arie et al. | | 340/461 |
| 2009/0284363 A1 * | 11/2009 | Havins | | 340/461 |
| 2011/0006892 A1 * | 1/2011 | Karpinsky | | 340/461 |
| 2011/0023822 A1 * | 2/2011 | Spivak | | 123/335 |
| 2012/0025967 A1 * | 2/2012 | Staffanou | | 340/441 |
| 2012/0221200 A1 * | 8/2012 | Golomb | | 701/36 |
| 2013/0002418 A1 * | 1/2013 | Nakamura et al. | | 340/441 |

* cited by examiner

*Primary Examiner* — Daniel Wu
*Assistant Examiner* — Kam Ma

(57) ABSTRACT

The presented invention is a low profile light bar tachometer display which includes a plurality of RGB LEDs or similar RGB color model light-emitting devices organized and arrayed in a segmented, flexible tachometer case that can be manipulated and contoured to conform to the top of the dash assembly of an automobile or any surface deemed suitable for the needs of the driver of an automobile. The lights provide a highly visible, illuminated, color changing display, so the driver can immediately assess the engine's RPM, power band, redline, or maximum torque from the change in light color or light position. The light array provides a repeatable, reliable and adjustable indication of the usable range of the engine's rpm, but does not indicate actual rpm.

13 Claims, 23 Drawing Sheets

LOW PROFILE FLEXIBLE LIGHT BAR TACHOMETER

RELATED APPLICATIONS

Not applicable.

FIELD OF THE INVENTION

The presented invention relates to tachometers in general, and more particularly to a flexible light bar tachometer case employing an array of light-emitting devices, providing a highly visible illuminated display that contours to the top of the dash assembly of an automobile.

BACKGROUND OF THE INVENTION

When driving a vehicle at high speed, it is dangerous to look at anything other than the road directly ahead. It is especially dangerous to look down at the dashboard display to read the tachometer or speedometer; not only may the vehicle travel a considerable distance while the gaze is averted, but the eyes take time to refocus when the driver looks down at the dashboard and then up to the road again. During that refocusing time critical events may take place that the driver may not fully perceive because of the delay in focusing. Further, the conventional numerical displays (whether digital or analog) require some time for interpretation. This is because the numbers symbolize and signify something and require at least a moment of cognition to ascertain what action, if any, to take in view of the information provided. Accordingly, racers using conventional tachometers occasionally simply memorize needle locations or make an educated guess as to actual engine RPM by considering other factors, such as engine sound.

Current known solutions to avoid the gaze-shifting problem include mounting the tachometer on the hood of the car or mounting the tachometer on top of the dash within the driver's general line of sight but, due to their sheer size, tachometers mounted on dashboards obstruct vision in some measure. Whether the tachometer is mounted within the driver's general line of sight or moved to one side, the driver's gaze is required to be shifted or averted from the road to view it.

Another proposed solution has been to "clock" the tachometer. "Clocking" entails rotating the tachometer in its housing, such that when the tachometer is indicating redline, the needle points straight up or in another preferred direction.

Other proposed solutions were the addition of shift lights to simplify the interpretation of shift points, or to add a pre-set indicator needle to the tachometer display. Adding a preset needle provides the tachometer with adjustability for a specific redline, so when the moving needle aligns with the pre-set indicator needle, the engine's redline or shift point is more easily determined.

These previous solutions improve, but do not eliminate, the gaze-shifting problem. Additionally, these solutions also do not make the determination of redline, or engine RPM, significantly easier for the driver to assess.

SUMMARY OF THE INVENTION

The presented invention is a flexible low profile, light bar tachometer that incorporates an array of lights that provide the driver of a vehicle with a dramatic visual prompt, for shifting up or down and the ability to visually monitor the engine's RPM range. The illuminated light bar display of the presented invention employs a row of lights arrayed in a flexible tachometer case that can be manipulated and contoured to conform to the top of the dash assembly of an automobile or any other surface deemed suitable for the needs of the driver. The flexible low profile light bar tachometer provides a reliable illuminated visual reference of the usable range of an engine's RPM without obstructing the driver's vision because it is designed for the driver to utilize peripheral vision to monitor the tachometer display.

In a preferred embodiment, RGB LEDs or lights that can change color are employed. Since this preferred light array includes RGB LED lights that can emit different color frequencies, the lights are driven such that the entire light array, to the extent that the illuminated lights have traveled sequentially across the display, change to the next chosen color. The driver can immediately assess the engine's RPM from light color or light position and the light array can display different colors to signify important RPM ranges or values such as power band, redline and maximum torque. A circuit connected to the headlight switch of the vehicle detects voltage to the headlights, such that during night or low light conditions the tachometer display can be dimmed.

Numerous methods are known for measuring engine and/or rotating shaft RPM, including the use of optoelectronic devices, voltage pulses, and, of course, the outdated technology of cables connected by gears to a drive shaft. The presented invention contemplates the use of any system and method of measuring engine RPM, which is then decoded and displayed in the presented invention.

It is therefore a first and principal object of the invention to display the usable range of engine RPM.

It is another object of the invention to provide a tachometer display that facilitates viewing through peripheral vision, rather than requiring direct viewing by the driver of a vehicle.

It is another object of the invention to provide an indication of the usable range of engine RPM through the use of color changing lights.

It is another object of the invention to provide a flexible light bar tachometer display that includes a light intensity adjustment.

It is another object of the invention to provide a flexible light bar tachometer case that can be manipulated and contoured to conform to the top of the dash assembly of an automobile or any surface deemed suitable for the needs of the driver.

It is another object of the invention to provide a color changing light array employing RGB LEDs or any similar light-emitting device that would satisfy the requirements of the application.

The invention will be better understood and objects other than those set forth above will become apparent when consideration is given to the following brief description thereof and the presented contribution to the art may be better appreciated.

BRIEF DESCRIPTION OF THE DRAWINGS

A general understanding of the presented invention may be obtained by reference to the accompanying drawings, when considered in conjunction with the subsequent brief description, in which.

Figure 1:
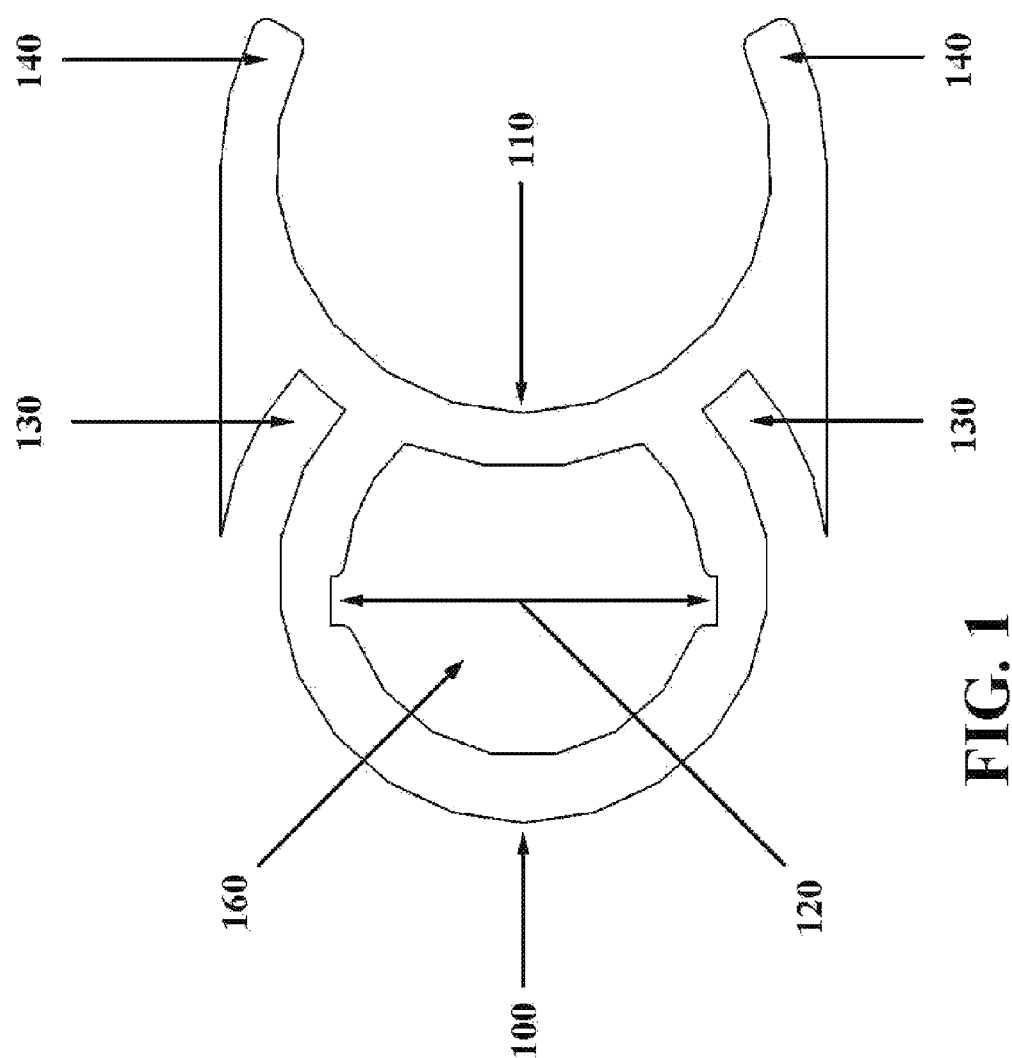
FIG. 1 is a front view of a center case segment.

It has thus been briefly outlined the more important features of the invention in order that the detailed description thereof that follows may be better understood, and in order that the presented contribution to the art may be better appreciated. There are, of course, additional features of the invention that will be described hereinafter and which will form additional subject matter of the claims appended hereto. Those skilled in the art will appreciate that the conception upon which this disclosure is based may be readily utilized as a basis for the designing of other structures, methods and systems for carrying out the several purposes of the presented invention. It is important, therefore, that the claims be regarded as including such equivalent constructions insofar as they do not depart from the spirit and scope of the presented invention.

DETAILED DESCRIPTION OF THE PREFERRED EMBODIMENT

Referring to, wherein like reference numerals refer to like components in the various views, a complete understanding of the presented invention may be obtained by reference to the accompanying drawings in this detailed description of a new low profile flexible light bar tachometer.

The preferred embodiment, demonstrated in the following example, describes rigid segments that can interlink with additional rigid segments, creating a flexible tachometer case of unlimited potential length. The rigid segments in the preferred embodiment are constructed of acrylic plastic but could be fabricated out of metal or any other material suitable for the application. The use of rigid segments that are movable in relation to each other, and are the preferred means of creating a flexible tachometer case, do not in any way limit the practice of the invention to the use of rigid segments. A flexible material such as silicon, vulcanized rubber, or any other appropriate material could be used as a means for creating a flexible tachometer case to hold the tachometer's electronic components as long as the material's properties were sufficient to house said components, while allowing the tachometer case to be manipulated and contoured to conform to the top of an automobile dash assembly or any other surface deemed suitable for the application.

The light array in the preferred embodiment employs a plurality of RGB LEDs, defined more specifically as Light-Emitting Diodes utilizing the RGB color model. The RGB color model is an additive color model in which Red, Green and Blue light are added together in various ways to reproduce a broad array of colors. The name "RGB" comes from the initials of the three additive primary colors: Red, Green, and Blue. RGB LEDs are also referred to as multi-colored white LEDs or tri-color LEDs. By blending and varying the intensity of each primary color, many different colors can be displayed allowing a precise dynamic color control.

Although the preferred embodiment employs a plurality of RGB LEDs as the light array, the light array is certainly not limited to the use of RGB LEDs. Other light-emitting devices that utilize the RGB color model could also be used in the light array and the presented invention includes the use of all similar RGB color model light-emitting devices for creating a light display. All RGB LEDs and similar RGB color model light-emitting devices herein will be referred to collectively as RGB LED or RGB LEDs.

In this preferred embodiment, RGB LED lights that can change color, are employed and since this preferred light array includes lights that can emit different color frequencies, the lights are driven such that the entire light array, to the extent that the illuminated lights have traveled across the display, change to the next chosen sequential color.

In the presented invention, four different colors are employed, each color representing a predetermined range of RPM. However, there is no essential requirement that four colors be employed, and in fact only two colors could be employed, with one color to signify when a critical RPM has been achieved. Alternatively, a much greater number of colors could be employed with colors changing gradually across the array. In fact, there could be any number of lights in the array as well as any combinations of colors. The light array could be progressively illuminated in various configurations. Examples of these configurations could be a converging display, diverging display or any progressive sequence deemed suitable for the application.

FIG. 1 shows a front view of a center case segment 300, which is comprised of an external cylinder surface 100, an internal cylinder surface 110, two case extensions 140, two case slots 130, a circuit board mounting slot 120 and a circuit board cavity 160.

Figure 2:
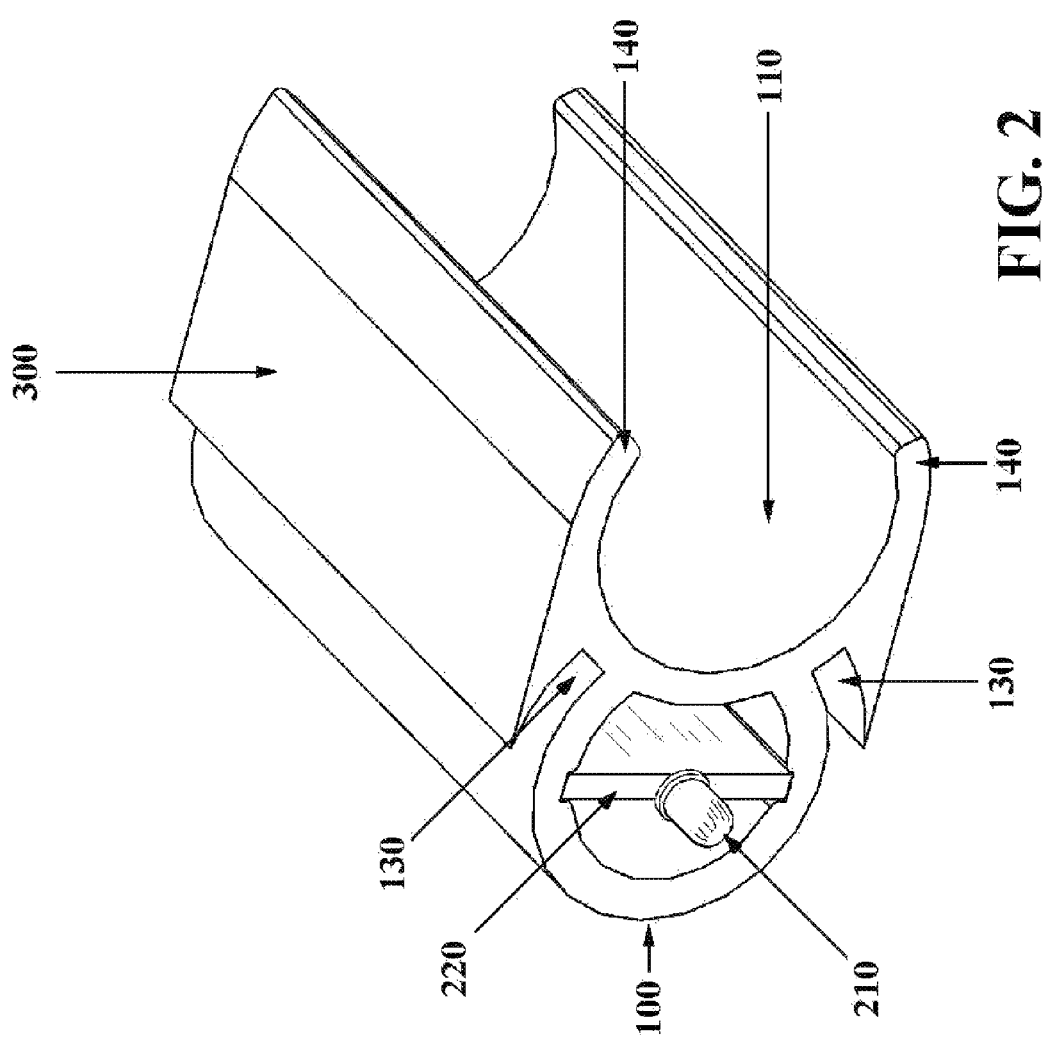
FIG. 2 is an upper right front perspective view of the center case segment shown in FIG. 1.

FIG. 2 shows a perspective view of the center case segment 300 shown in FIG. 1, with a circuit board 220 inserted into the circuit board mounting slot 120 and an RGB LED 210 positioned on the circuit board 220.

Figure 3:
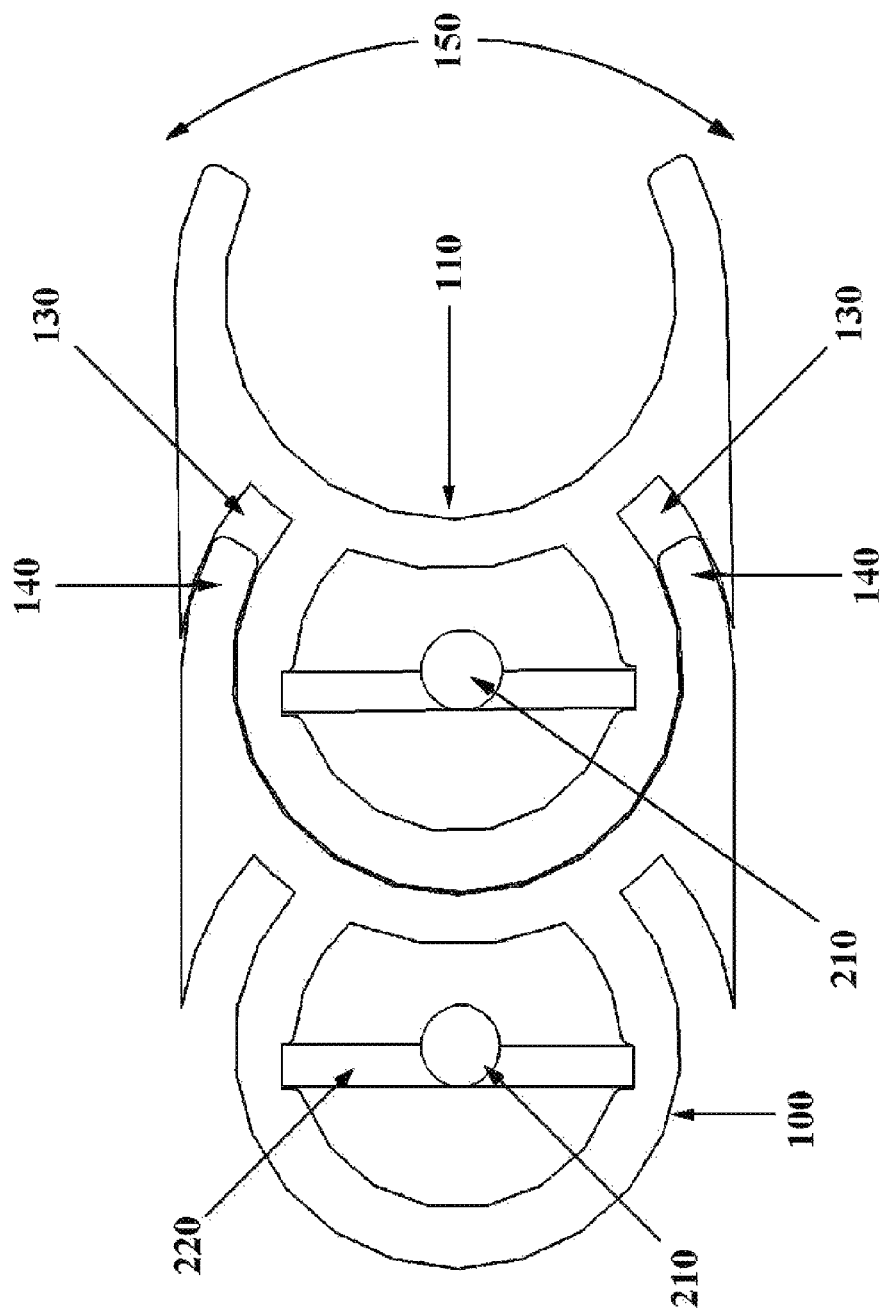
FIG. 3 is a front view of two center case segments linked together.

FIG. 3 shows a front view of two center case segments 300 demonstrating how said center case segments are linked together. The two center case segments 300 are linked by coaxially aligning the external cylinder surface 100 with the internal cylinder surface 110 and aligning the case extensions 140 with the case slots 130. The two center case segments 300 are then slid together until the ends are flush, as illustrated in this figure. The two center case segments 300 are then movable 150 in relation to each other to the extent that one of the case extensions 140 bottoms out in the case slot 130, limiting the movement.

Figure 4:
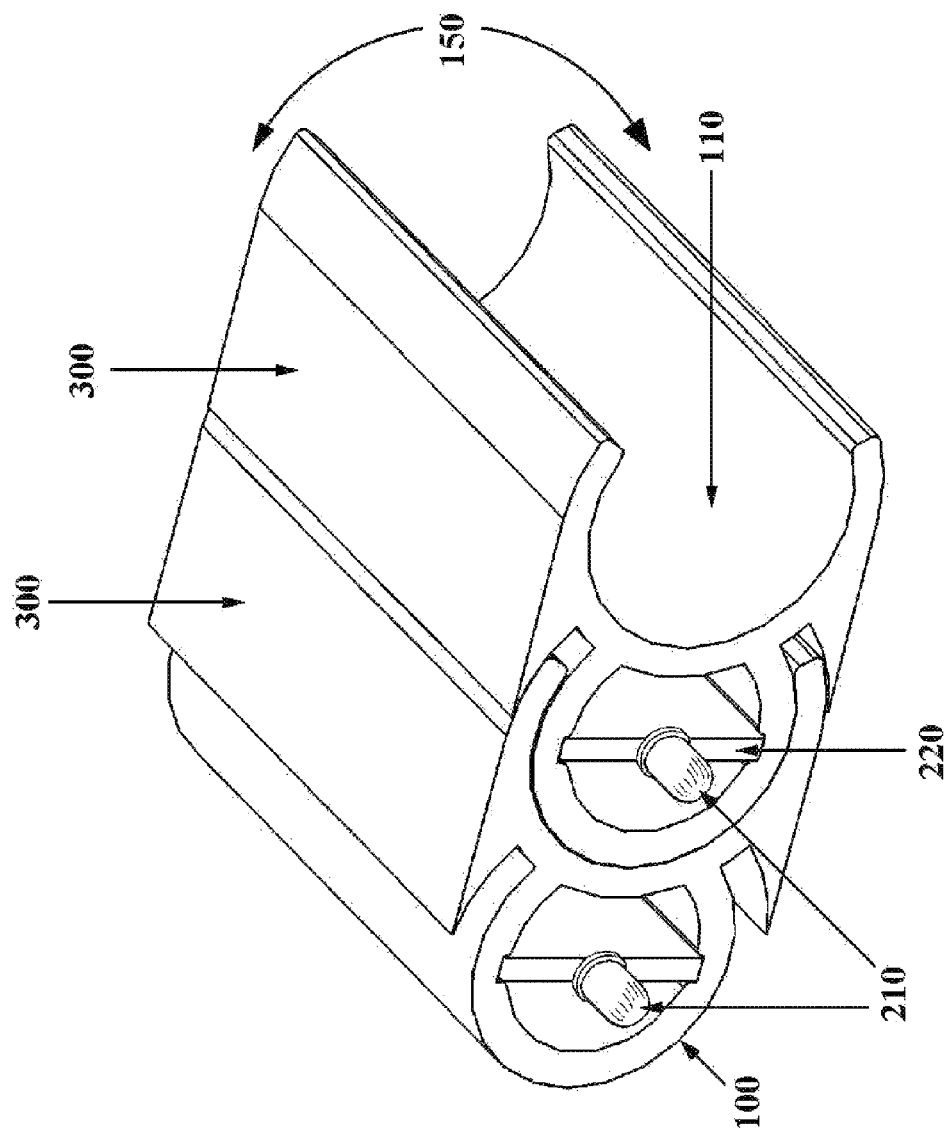
FIG. 4 is an upper right front perspective view of the two center case segments linked together shown in FIG. 3.

FIG. 4 shows a perspective view of the two linked center case segments 300 shown in FIG. 3.

Figure 5:
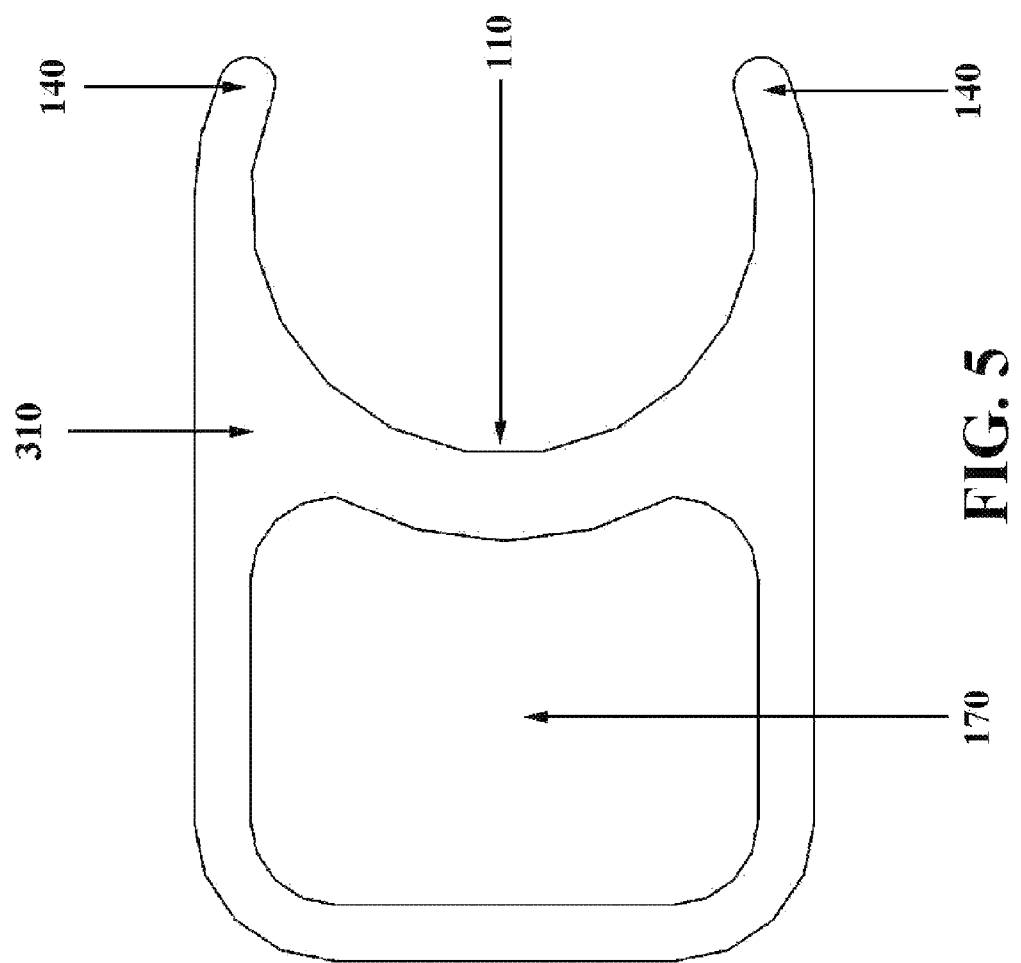
FIG. 5 is a front view of a left case segment.

FIG. 5 shows a front view of a left case segment 310, which is comprised of an internal cylinder surface 110, a left case cavity 170 and two case extensions 140.

Figure 6:
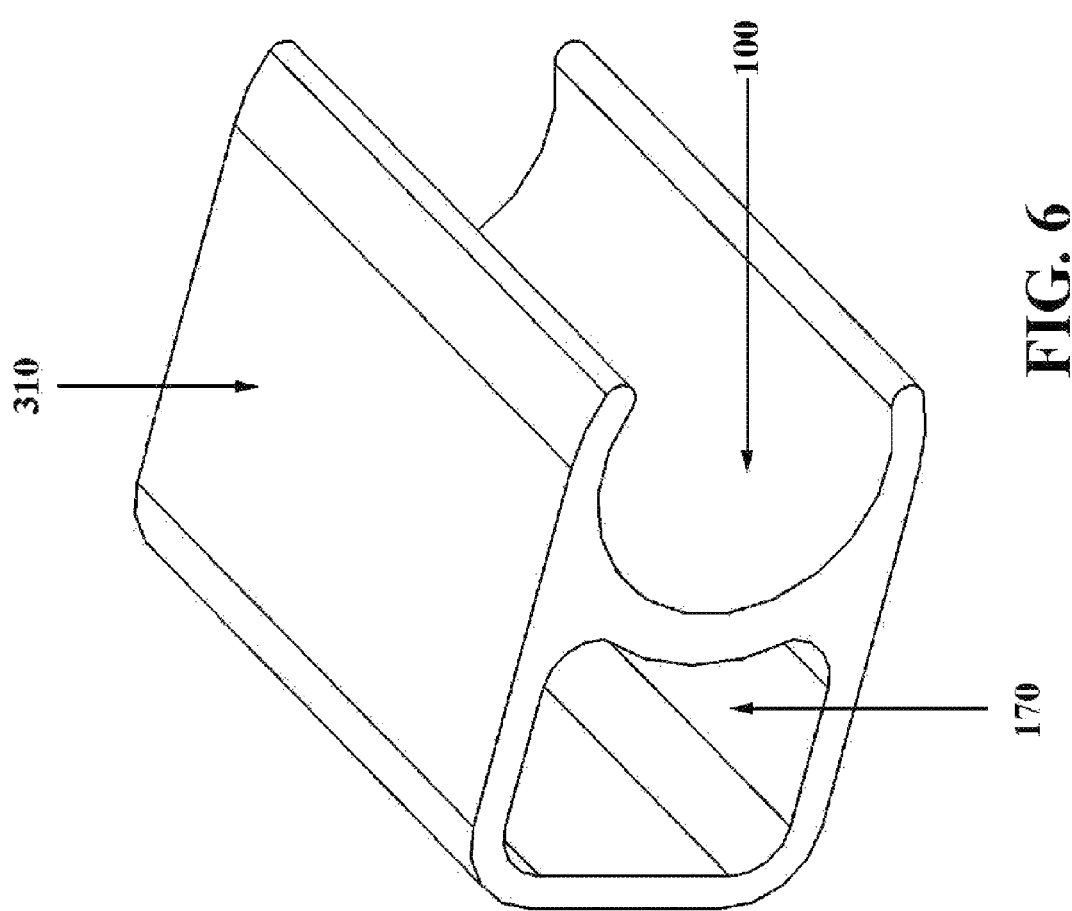
FIG. 6 is an upper right front perspective view of the left case segment shown in FIG. 5.

FIG. 6 shows a perspective view of the left case segment 310 shown in FIG. 5.

Figure 7:
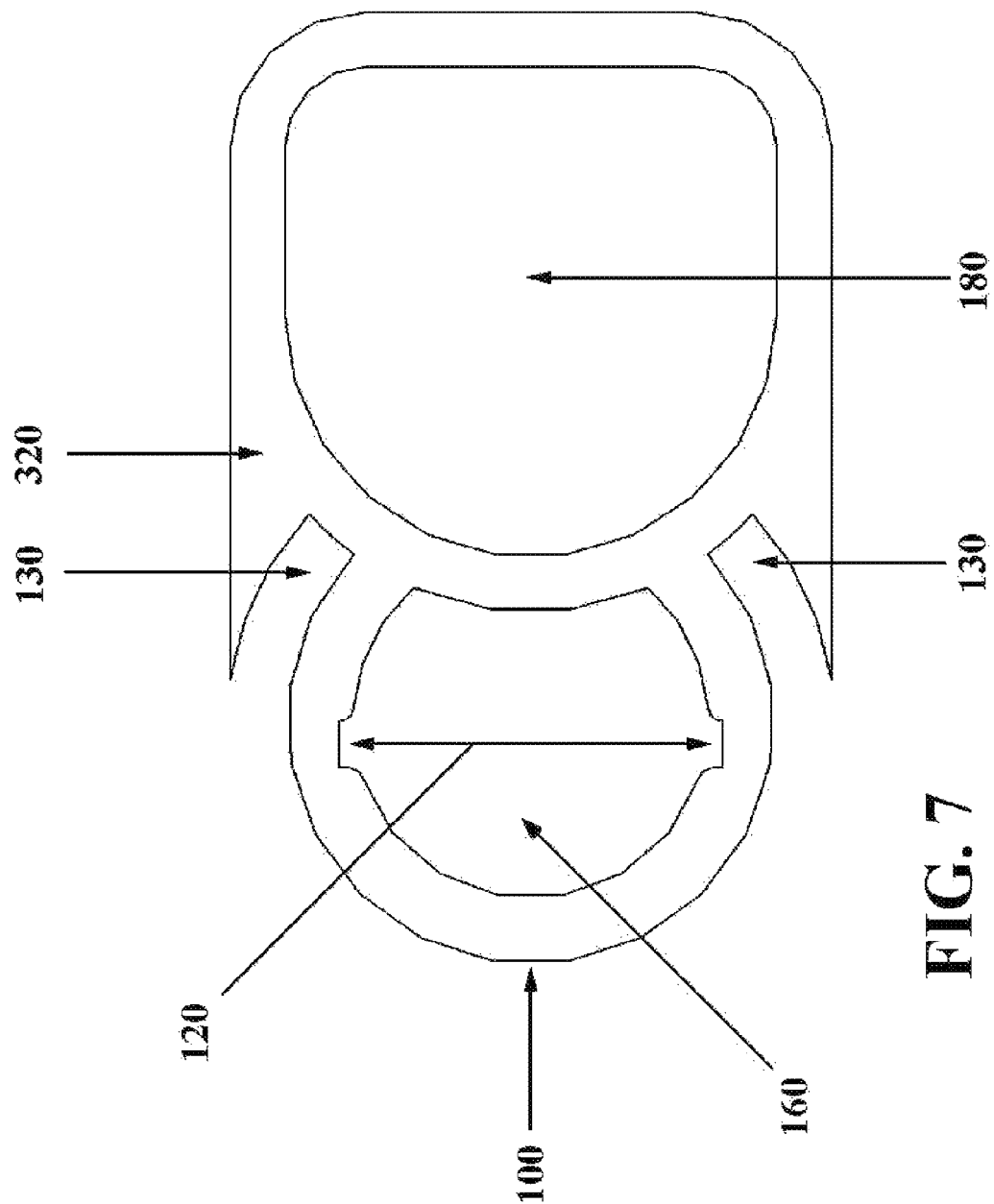
FIG. 7 is a front view of a right case segment.

FIG. 7 shows a front view of a right case segment 320 which is comprised of an external cylinder surface 100, a circuit board mounting slot 120, a circuit board cavity 160, a right case cavity 180 and two case slots 130.

Figure 8:
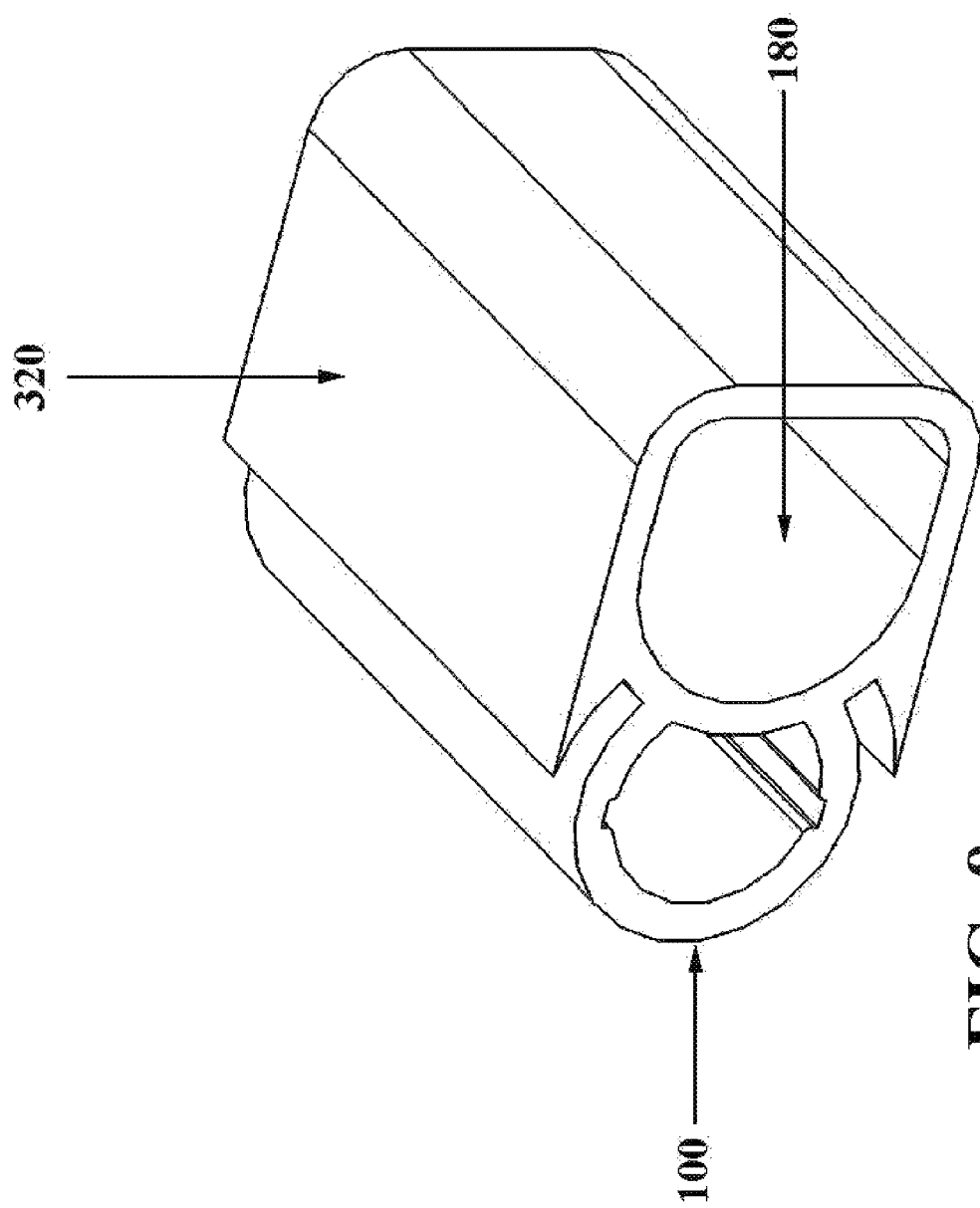
FIG. 8 is an upper right front perspective view of the right case segment shown in FIG. 7.

FIG. 8 shows a perspective view of the right case segment 320 shown in FIG. 7.

Figure 9:
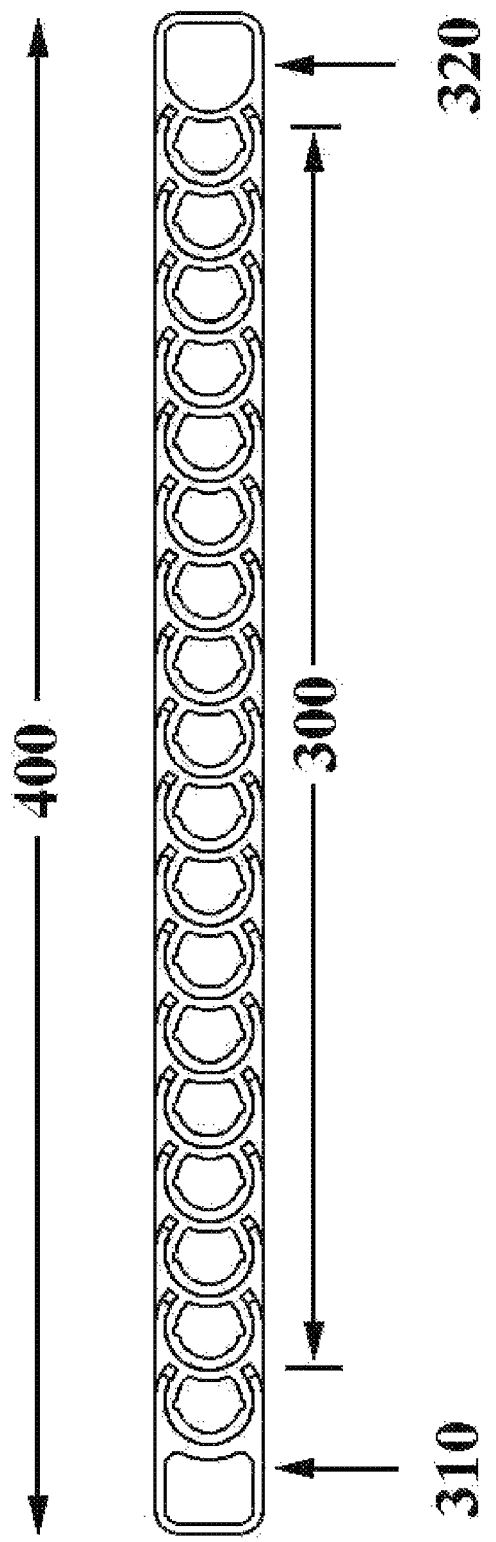
FIG. 9 is a front view of a straight segment chain.

FIG. 9 shows a front view of 16 linked center case segments 300 linked to a left case segment 310 and a right case segment 320, creating a plurality of case segments, herein referred to collectively as a "segment chain 400", resulting in a segment chain 400 that can universally accommodate a variety of contours and/or surfaces such as, but not limited to, the curvature found on the top of an automobile dash assembly 230. The quantity of center case segments 300 utilized could potentially be any amount and is certainly not limited to 16 as demonstrated in this example. The actual quantity of center case segments 300 utilized would simply create a segment chain 400 of sufficient length that would satisfy the requirements of a particular application.

The plurality of center case segments 300 and the one right case segment 320, each house a small circuit board 220 with an attached RGB LED 210, best illustrated by FIGS. 2-4, that is inserted into each circuit board mounting slot 120 located inside each circuit board cavity 160. The circuit board 220 and attached RGB LED 210 in each circuit board cavity 160 is connected to each other with a cable or a sufficient number of wires needed for the application to provide power and a signal to drive the RGB LED 210.

The plurality of RGB LEDs 210 used in this application are purchased from Hebei I.T. (Shanghai) Co., Ltd., a Chinese manufacturer of various electronic components but mostly LED lights. Any other similar light-emitting device that would satisfy the requirements of this application could be used and is certainly not limited to any specific manufacturer or device. The circuit board 220 holds some of the electronic components and is electrically connected (not shown) to the vehicle's (12 V) source of electrical power, the vehicle's headlight power circuit, ground, and the electronic tachometer signal.

Figure 10:
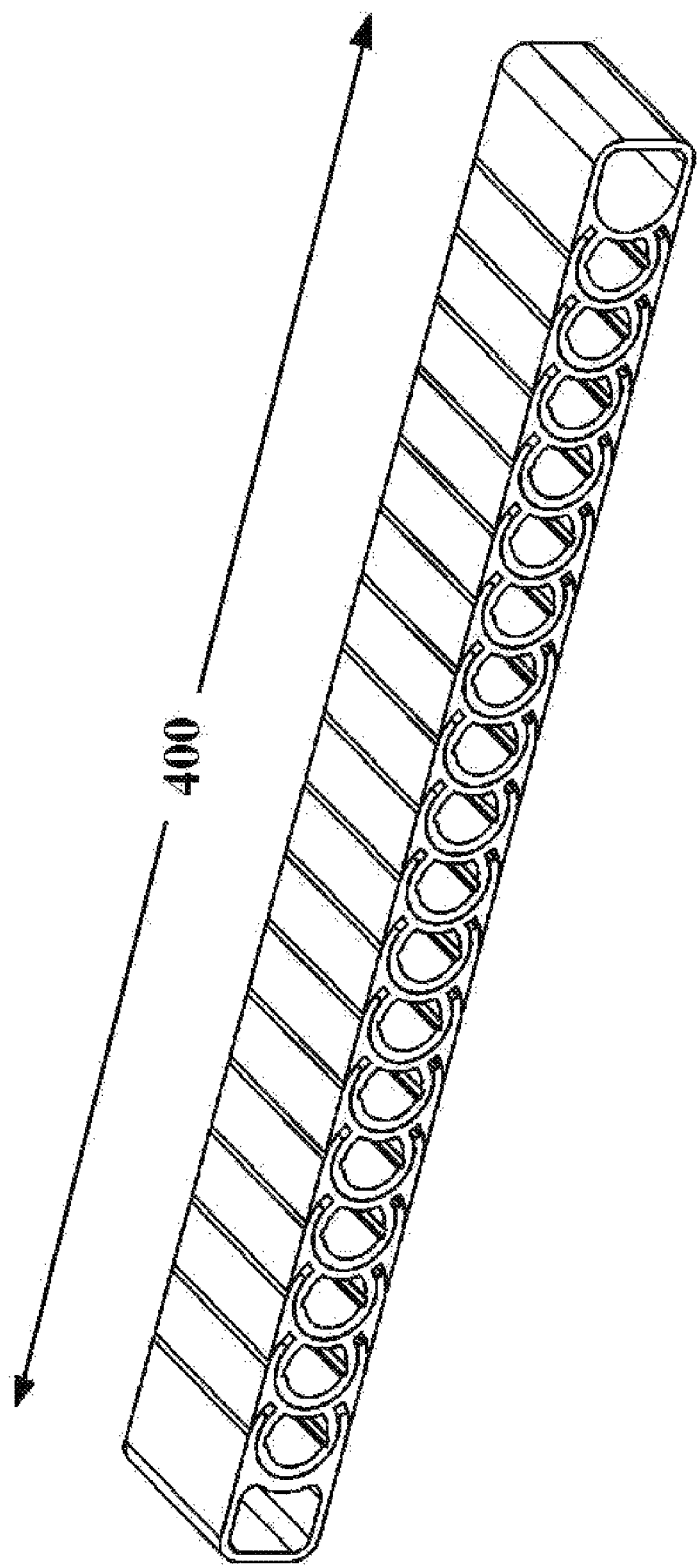
FIG. 10 is an upper right front perspective view of the straight segment chain shown in FIG. 9.

FIG. 10 shows a perspective view of the segment chain 400 shown in FIG. 9.

Figure 11:
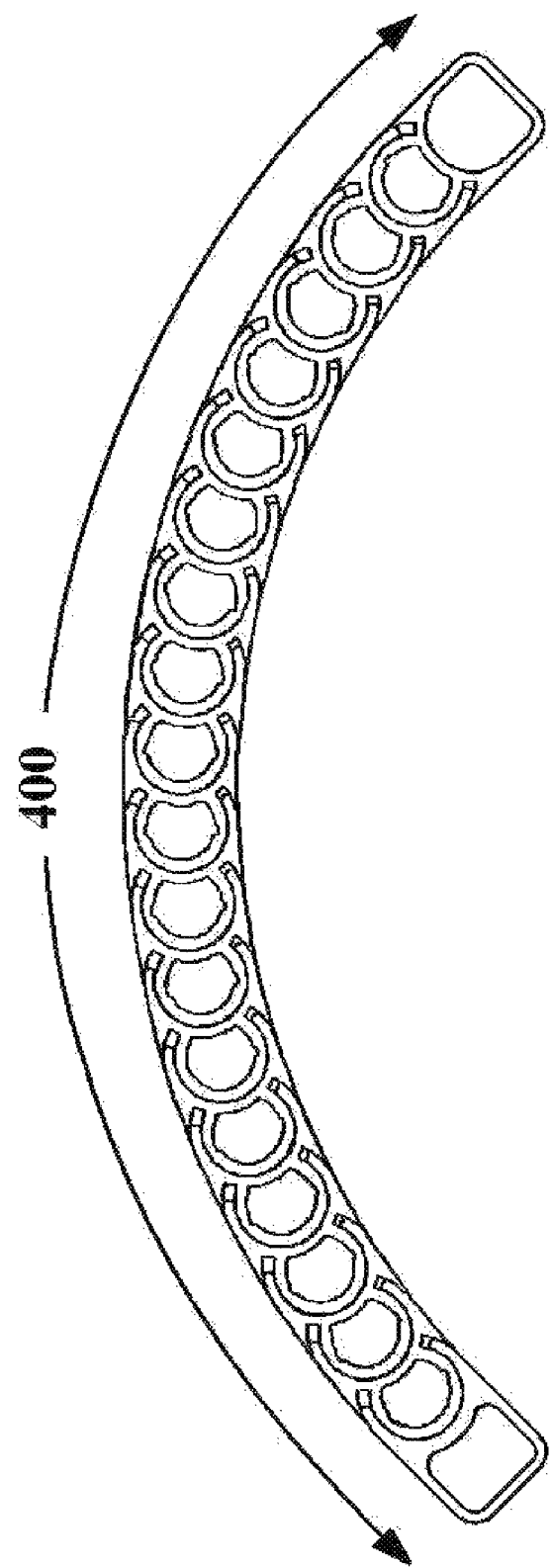
FIG. 11 is a front view of a curved segment chain.

FIG. 11 shows a front view of the segment chain 400 that has been manipulated to follow a curve such as the curve of the top of the dash assembly 230 of an automobile.

Figure 12:
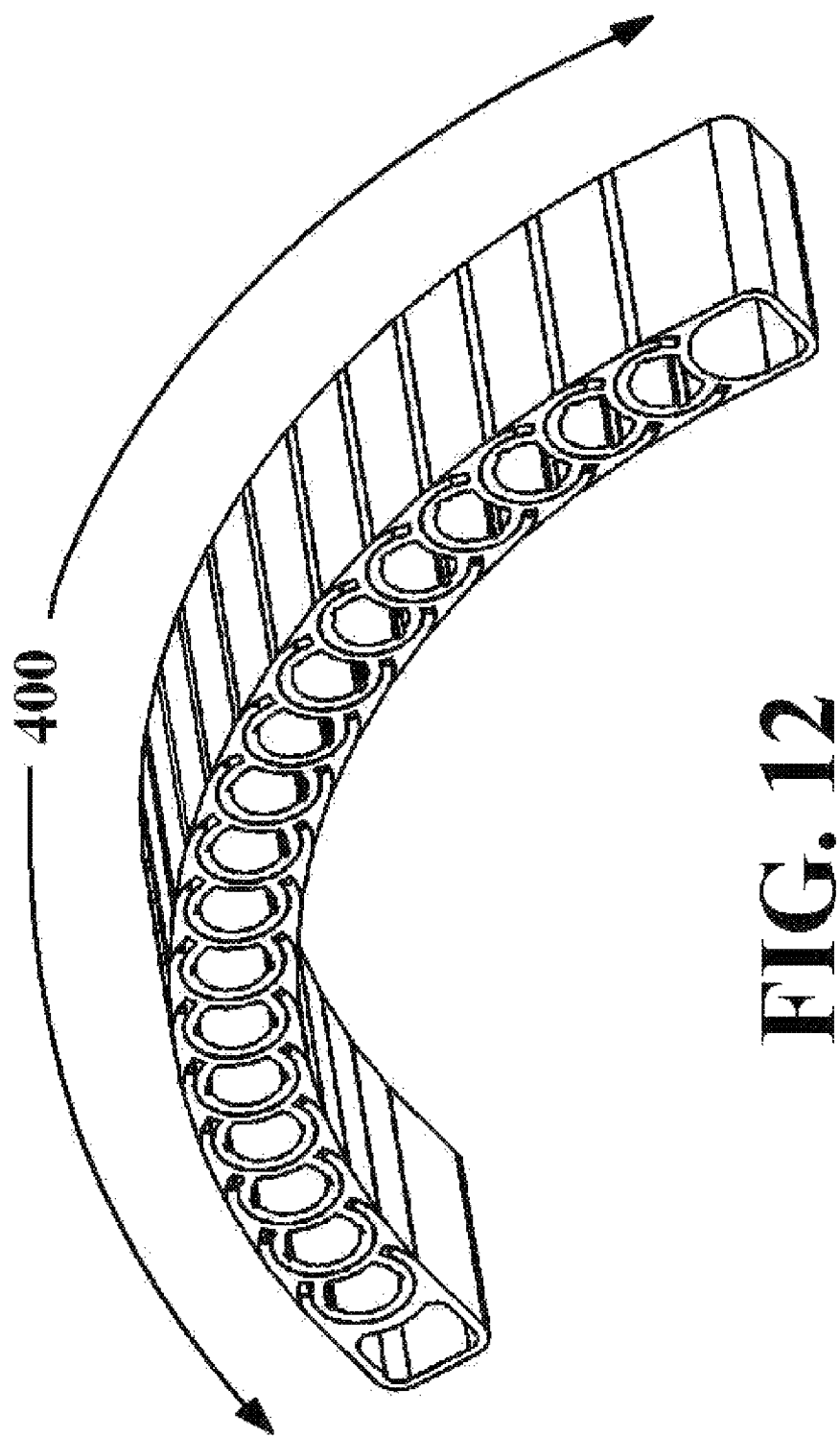
FIG. 12 is an upper right front perspective view of the curved segment chain shown in FIG. 11.

FIG. 12 shows a perspective view of the segment chain 400 shown in FIG. 11.

Figure 13:
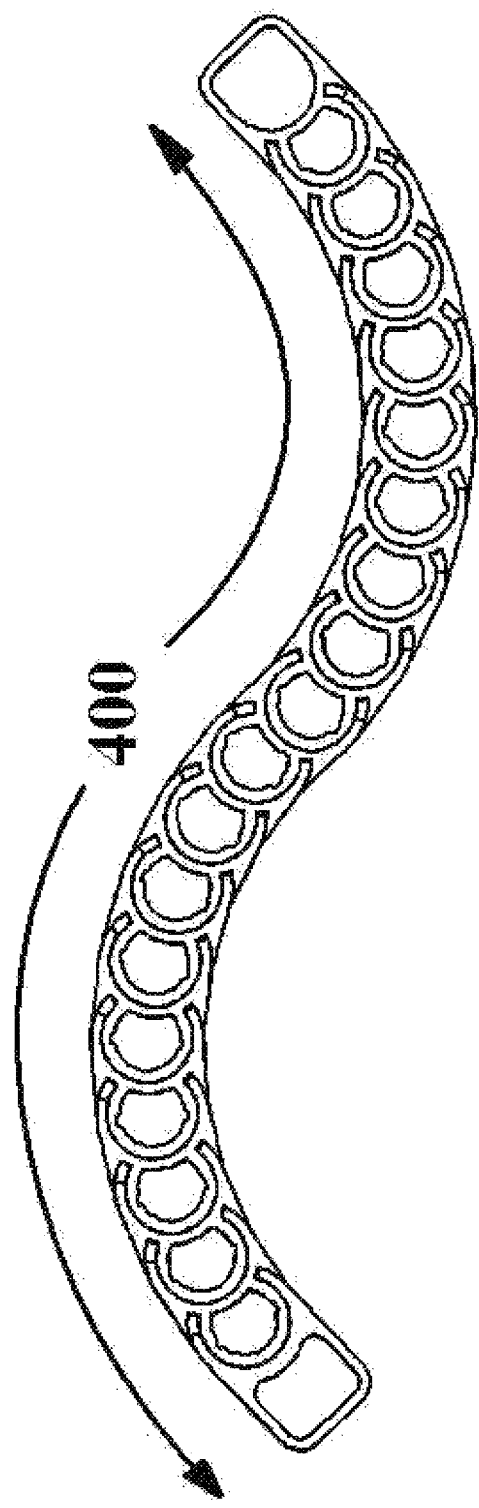
FIG. 13 is a front view of a combined curved segment chain.

FIG. 13 shows a front view of the segment chain 400 contoured in a combined curve. This figure more clearly demonstrates the flexibility of the segment chain 400.

Figure 14:
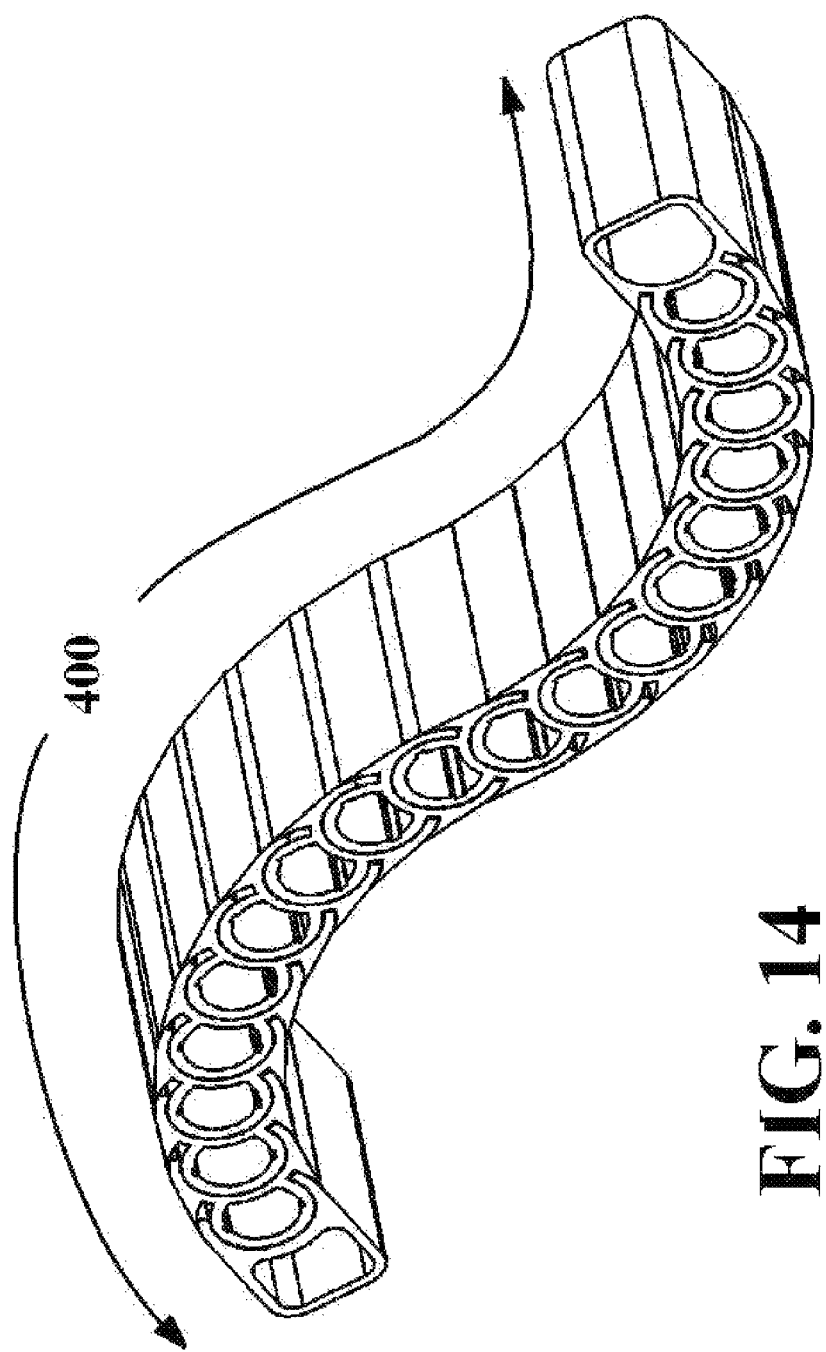
FIG. 14 is an upper right front perspective view of the combined curved segment chain shown in FIG. 13.

FIG. 14 shows a perspective view of the segment chain 400 shown in FIG. 13.

Figure 15:
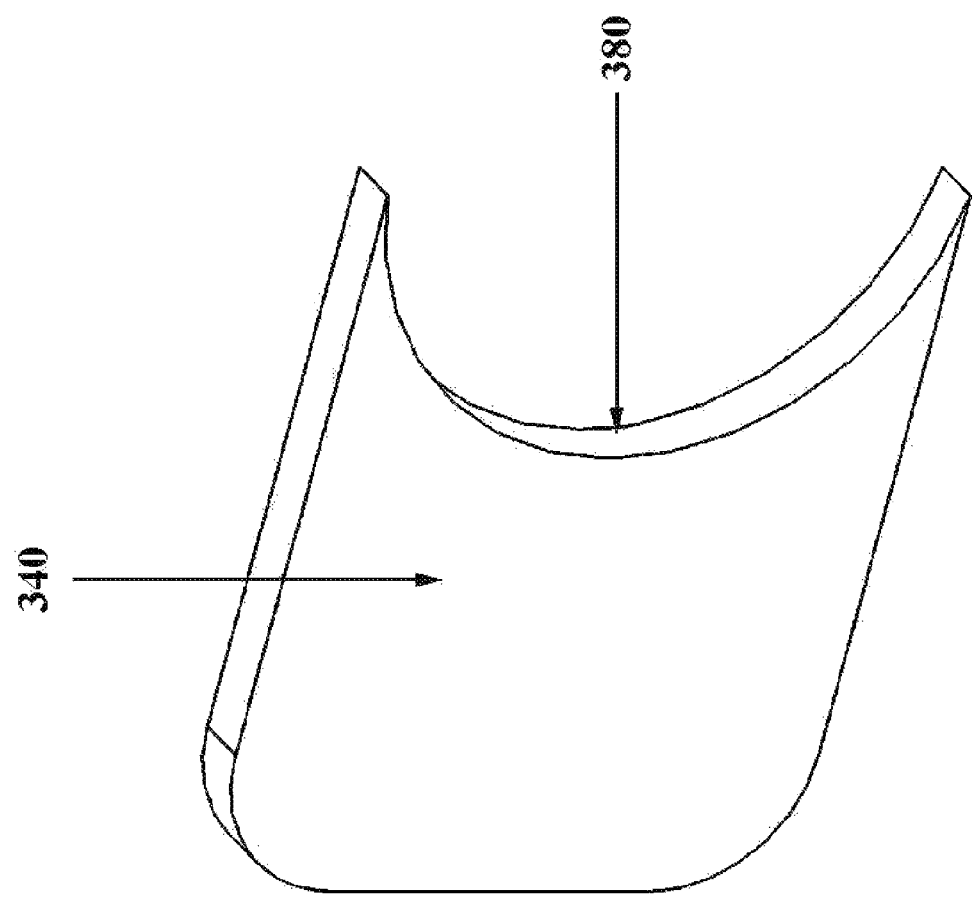
FIG. 15 is an upper right front perspective view of a left case segment end cap.

FIG. 15 shows a perspective view of a left case segment end cap 340 that is designed to be affixed to the end of the left case segment 310, as shown in FIGS. 5 and 6, enclosing the left case cavity 170. The left case segment end cap 340 captures the relative segments of the segment chain 400 so they cannot slide apart, but are still movable 150 in relation to each other as illustrated in FIGS. 3 and 4.

Figure 16:
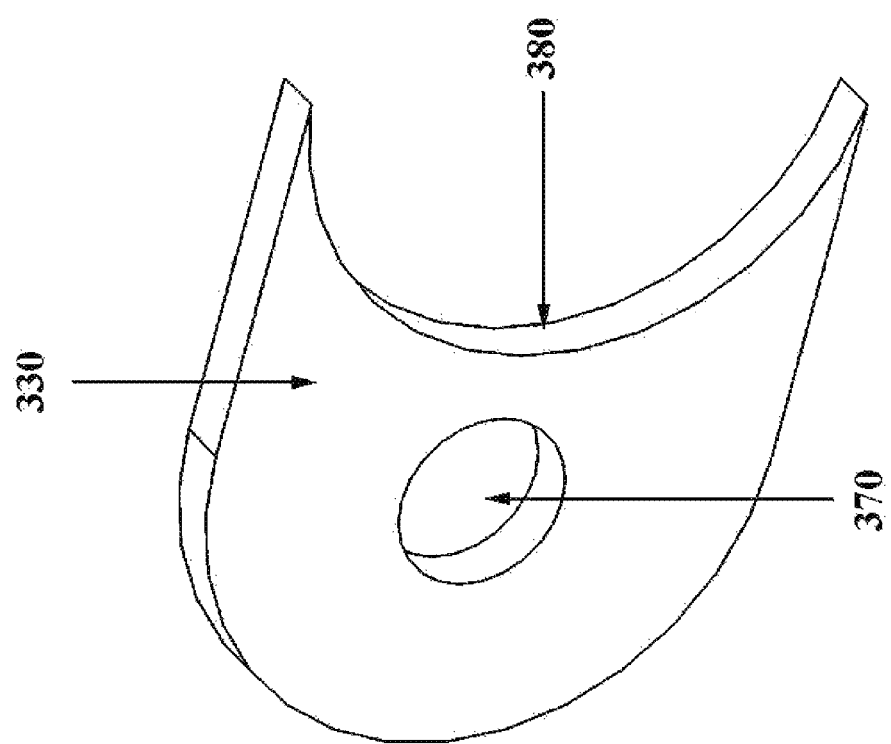
FIG. 16 is an upper right front perspective view of a center case segment end cap with an aperture for an RGB LED.

FIG. 16 shows a perspective view of a center case segment end cap 330 that is designed to be affixed to the end of a center case segment 300, as shown in FIGS. 1-4, enclosing the circuit board cavity 160. It incorporates an aperture 370 that houses the RGB LED 210 allowing the transmission of light from within the circuit board cavity 160 or the aperture could be utilized as a form of stability for the RGB LED. The RGB LED 210 is mounted on a circuit board 220, as shown in FIGS. 2 and 4, that is inserted into the circuit board mounting slot 120, aligning with the aperture 370. The center case segment end cap 330 captures the relative segments of the segment chain 400 so they cannot slide apart, but are still movable 150 in relation to each other as illustrated in FIGS. 3 and 4.

Figure 17:
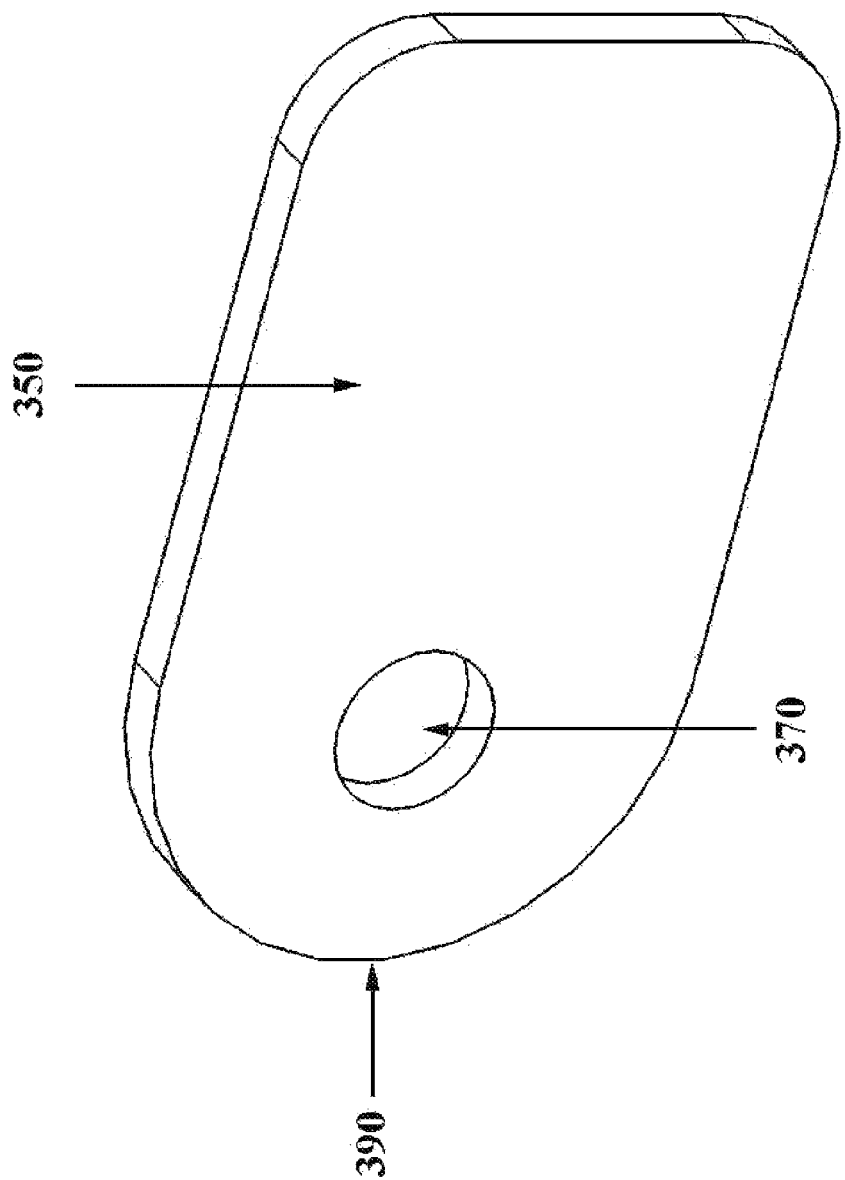
FIG. 17 is an upper right front perspective view of a right case segment end cap with an aperture for an RGB LED.

FIG. 17 shows a perspective view of a right case segment end cap 350 that is designed to be affixed to the end of a right case segment 320, as shown in FIGS. 7 and 8, enclosing the right case cavity 180 and the circuit board cavity 160. It incorporates an aperture 370 that houses the RGB LED 210 allowing the transmission of light from within the circuit board cavity 160 or the aperture could be utilized as a form of stability for the RGB LED.

The RGB LED 210 is mounted on a circuit board 220, as shown in FIGS. 2-4, that is inserted into the circuit board mounting slot 120, and aligned with the aperture 370. The right case segment end cap 350 captures the relative segment of the segment chain 400 so they cannot slide apart, but are still movable 150 in relation to each other as illustrated in FIGS. 3 and 4.

Figure 18:
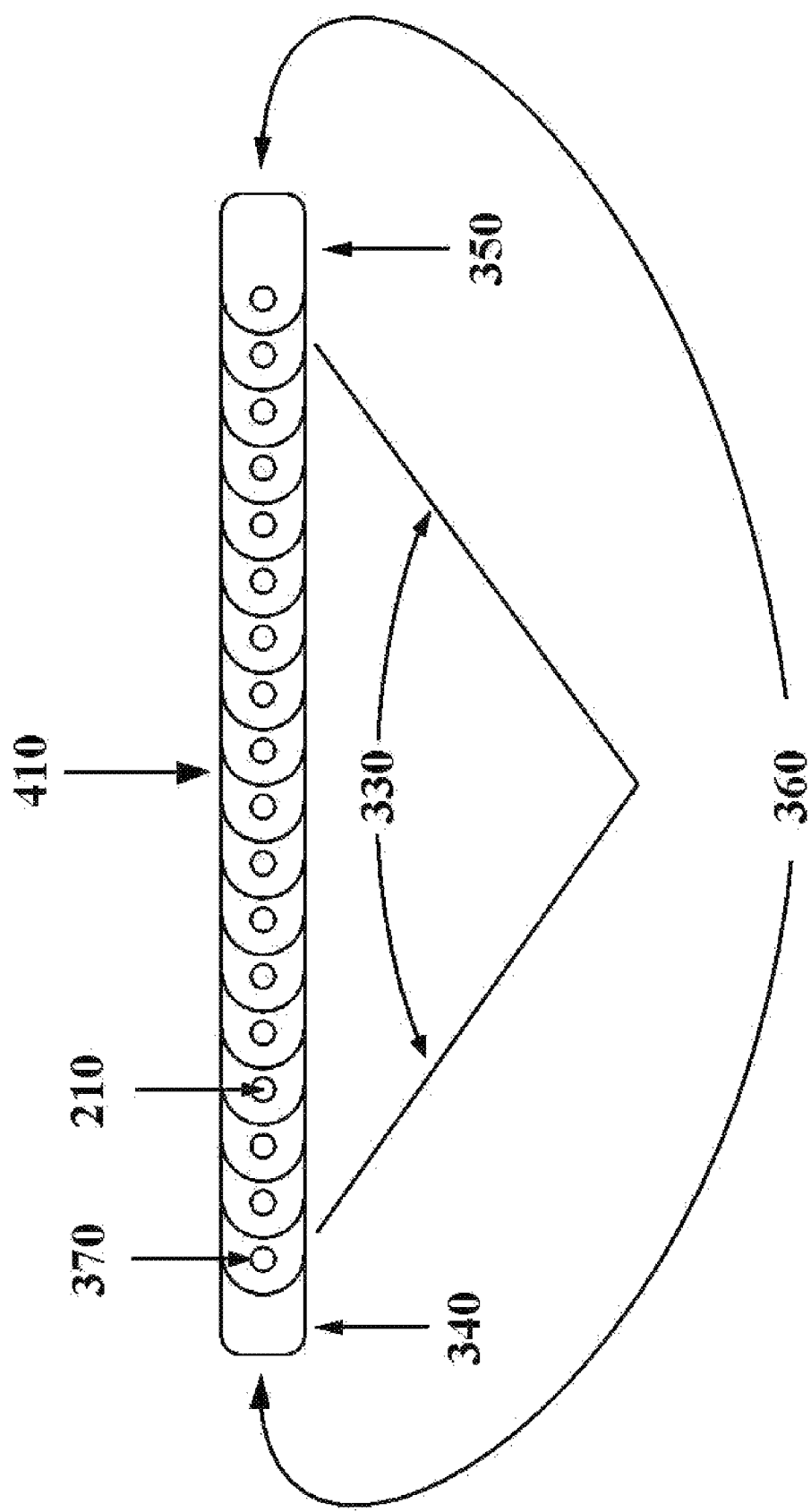
FIG. 18 is a front view of a low profile flexible light bar tachometer.

FIG. 18 shows a front view of a low profile flexible light bar tachometer 410 comprising a plurality of center case segment end caps 330, a plurality of left case segment end caps 340, a plurality of right case segment end caps 350 herein referred to collectively as "segment end caps 360" affixed to the segment chain 400, with the plurality of RGB LEDs 210 disposed on a plurality of circuit boards 220 contained within the segment chain 400, connected to some of the electronic components and needed wiring (not shown).

Although FIGS. 15-17 demonstrate a specific design for the segment end caps 360, the diagram shown does not in any way limit the practice of the invention to the use of to these specific shapes. The segment end caps 360 could be of any design as long as they, provide an aperture 370 in which the circuit board 220 and RGB LED 210 is positioned to allow the transmission of light or stabilize the RGB LED, prevent the segment chain 400 segments from sliding apart, and allow the free movement of the segment chain 400 segments in relation to one another. Alternatively, the segment end caps could be incorporated into the design of the segments, provided the segments were able to be movable in relation to one another. One such example would be that a segment end cap be incorporated into one end of a segment with the end cap on the other end of the segment having to be attached to the segment in some manner.

The segment end caps 360 on the opposite end (not shown) of the segment chain 400, although similar in design, do not incorporate an aperture 370. These segment end caps 360 reasonably seal the opposite end of each of the segment chain 400 while allowing free movement of the segment chain 400 segments. The end cap inner curved surface 380 and the end cap outer curved surface 390 rotate in relation to each other providing an acceptable finished appearance to the front of the segment chain 400.

Figure 19:
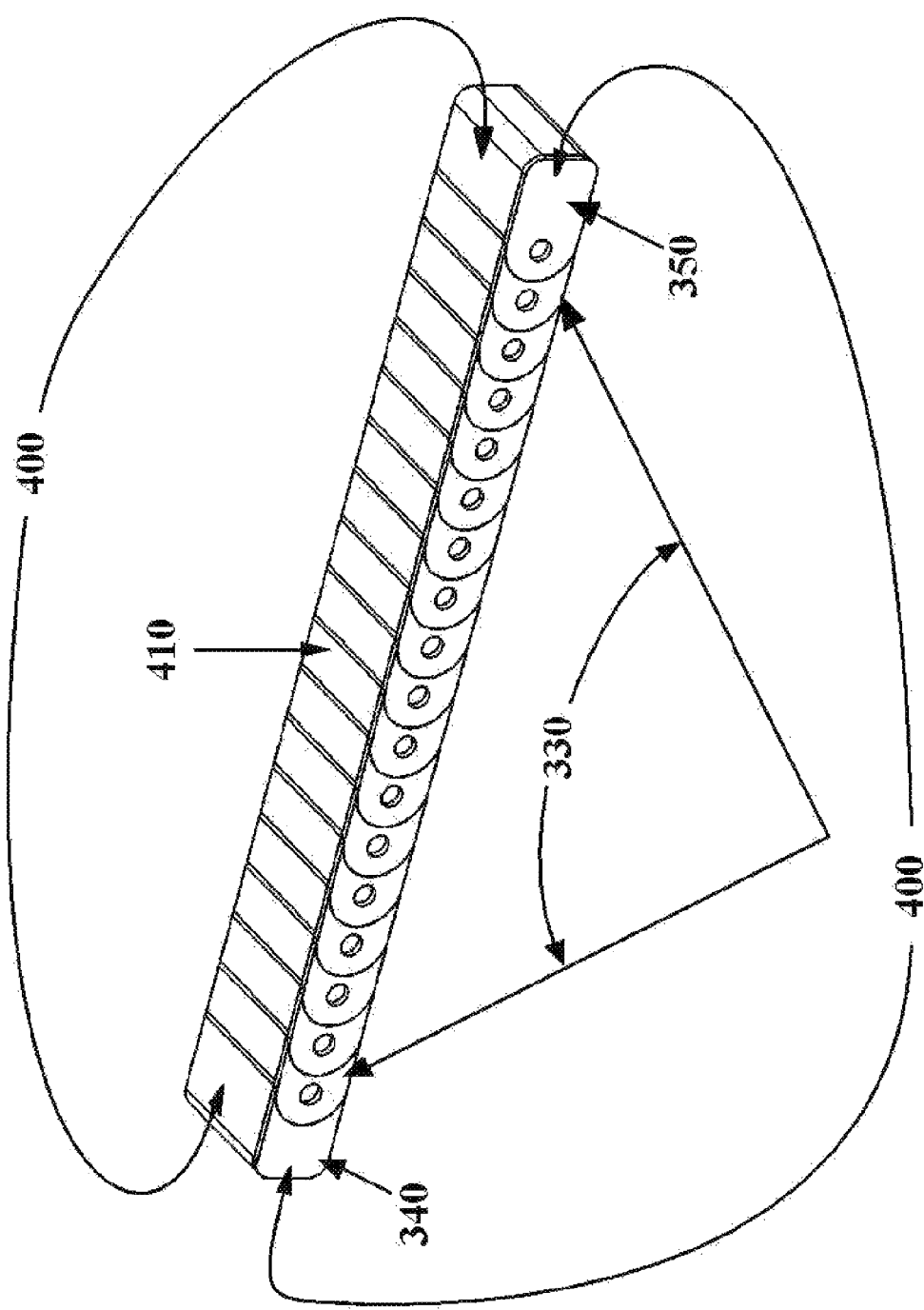
FIG. 19 is an upper right front perspective view of the low profile flexible light bar tachometer shown in FIG. 18.

FIG. 19 shows a perspective view of the low profile flexible light bar tachometer 410 shown in FIG. 18.

Figure 20:
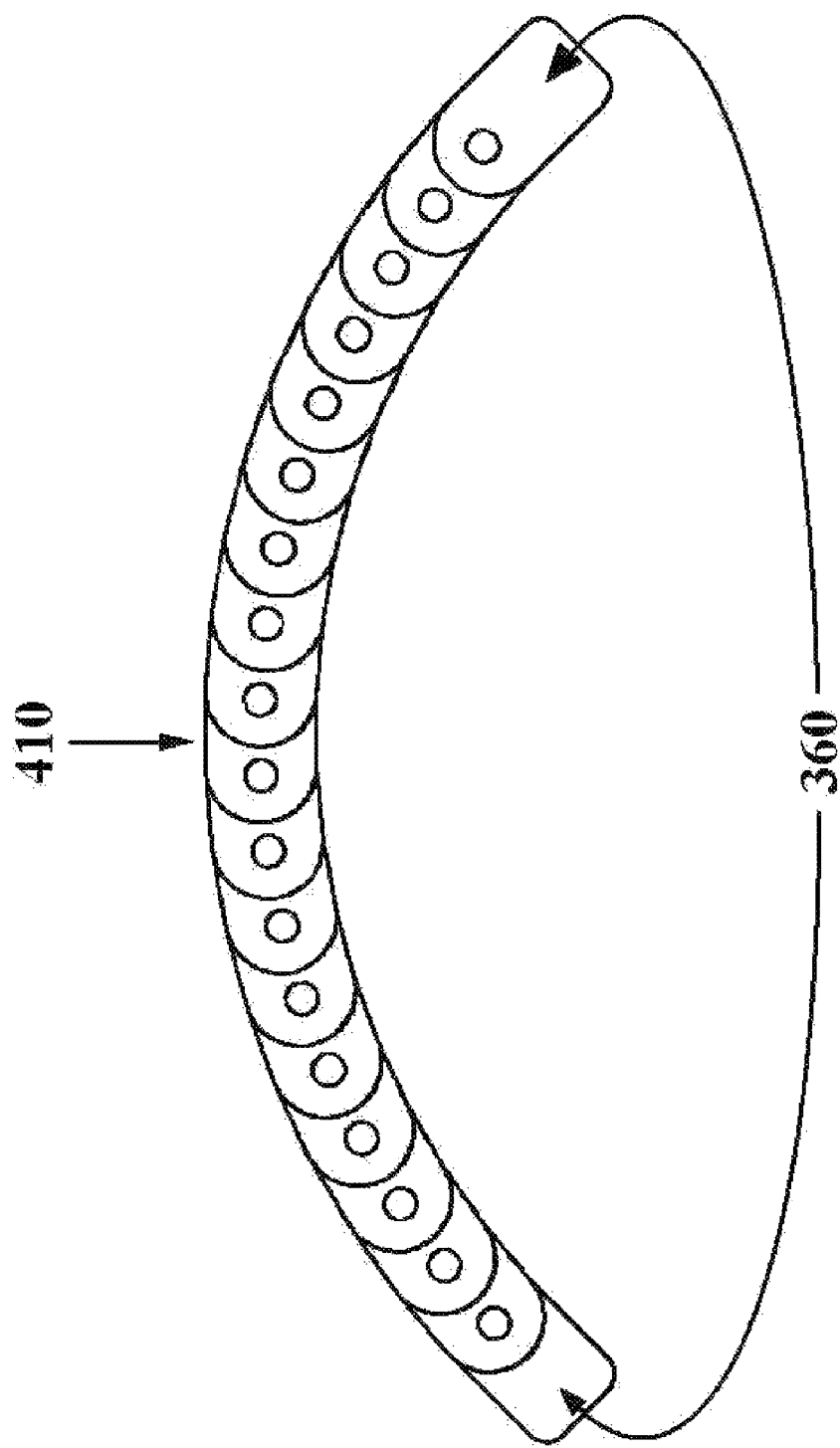
FIG. 20 is a front view of a curved low profile flexible light bar tachometer.

FIG. 20 shows a front view of the low profile flexible light bar tachometer 410 manipulated and contoured to conform to a curve similar to, but not limited to, the curve of the top of the dash assembly 230 of an automobile.

Figure 21:
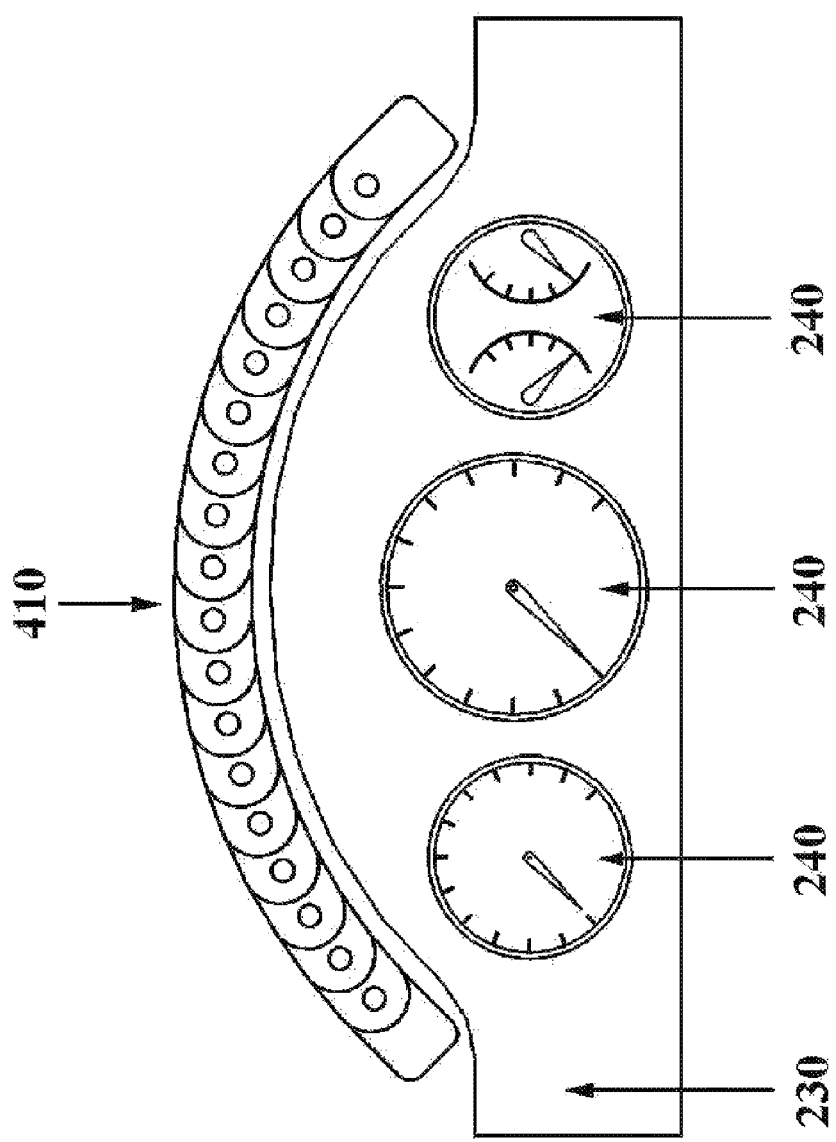
FIG. 21 is a front view of the curved low profile flexible light bar tachometer shown in FIG. 20, mounted on the top of a dash assembly of an automobile.

FIG. 21 shows a front view of low profile flexible light bar tachometer 410 contoured to follow the curve on the top of the dash assembly 230 of an automobile and the instruments or gauges 240 positioned under the dash assembly 230. In this example, the curve of the top of the dash assembly 230 is the demonstrated curve, however, there are other curves or surfaces that the low profile flexible light bar tachometer 410 could accommodate and is certainly not limited to the curve on the top of the dash assembly 230. The surface utilized is whatever is determined to be the most suitable for the application. The low profile flexible light bar tachometer 410 can be attached to the top of the dash assembly 230, or whatever surface satisfies the installation requirements, with Velcro or any other means suitable for a particular application.

Figure 22:
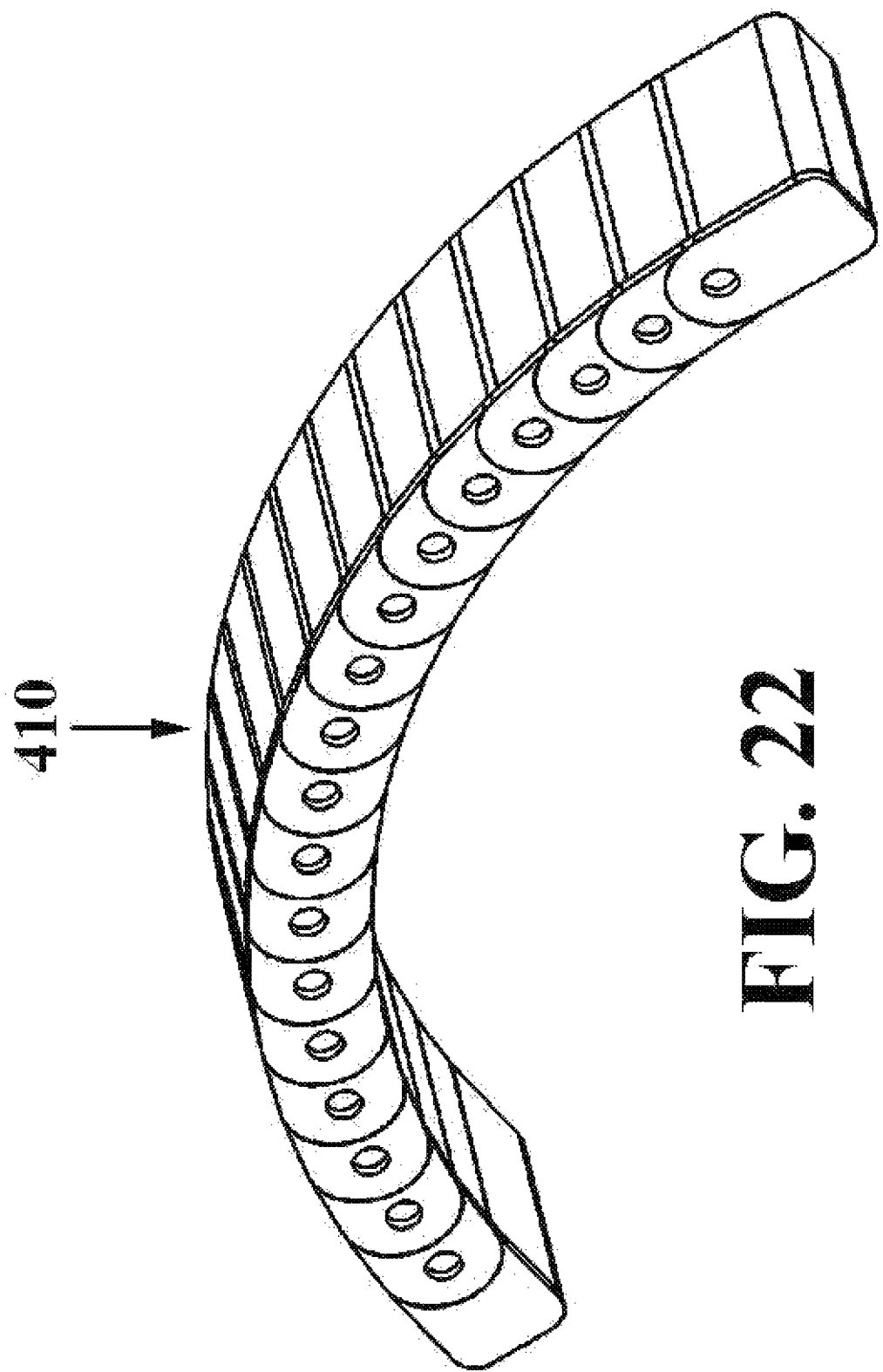
FIG. 22 is an upper right front perspective view of a curved low profile flexible light bar tachometer shown in FIG. 20.

FIG. 22 shows a perspective view of the low profile flexible light bar tachometer 410 shown in FIGS. 18-21.

Figure 23:
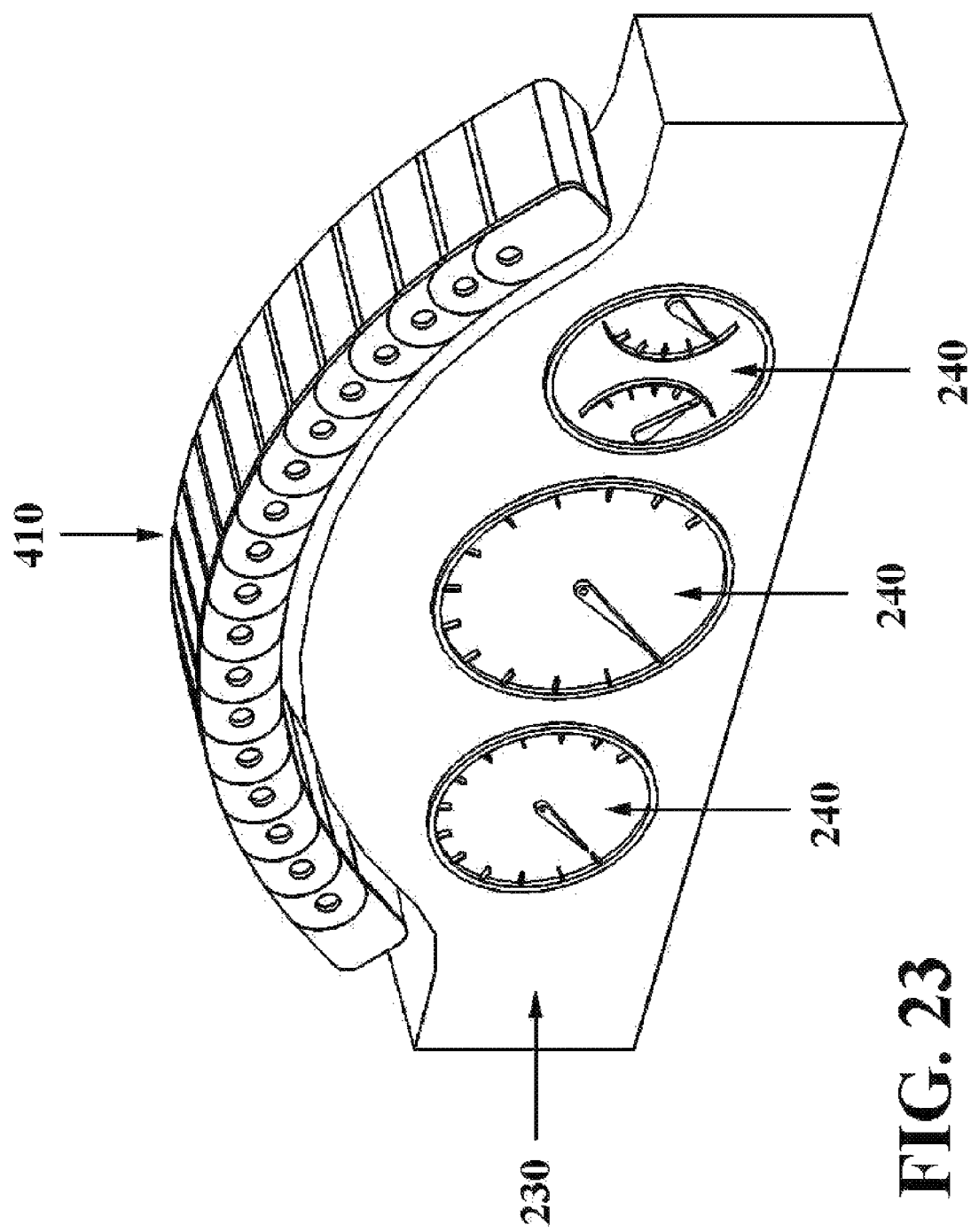
FIG. 23 is an upper right front perspective view of the curved low profile flexible light bar tachometer shown in FIG. 20 mounted on the top of a dash assembly of an automobile.

FIG. 23 shows a perspective view of the low profile flexible light bar tachometer 410 shown in FIGS. 18-22 mounted on top of the dash assembly 230 and the instruments or gauges 240 of an automobile. This preferred embodiment features the plurality of RGB LEDs 210 countersunk in the plurality of apertures 370 of the segment end caps 360 preventing sunlight or any other light source from shining directly on them. This, however, does not limit the plurality of RGB LEDs 210 to being countersunk in the plurality of apertures 370 of the segment end caps 360. If so desired, the plurality of RGB LEDs 210 could be extended to the outside of the segment chain 400, as long as the emitted light was satisfactorily visible to the driver.

The RGB LEDs 210 or any similar RGB color model light-emitting devices could also be incorporated into the dash assembly 230 and thus shed it's segment chain 400 without deviating from the color changing light aspect of the current invention presented. The plurality of RGB LEDs 210 or similar RGB color model light-emitting devices and the plurality of circuit boards 220, depending on the requirements of the application, and the physical characteristics of the vehicles dash assembly, could be imbedded into the dash assembly 230, as long as the emitted light was satisfactorily visible to the driver.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes, and equivalents will readily occur to those skilled in the art and may be employed, as suitable, without departing from the true spirit and scope of the invention. Such changes might involve alternative materials, components, structural arrangements, sizes, shapes, forms, functions, operational features or the like. Therefore, the above description and illustrations should not be construed as limiting the scope of the invention, which is defined by the appended claims.

What is claimed is:

1. A low profile flexible light bar tachometer for displaying the rpm of an engine, comprising:
a means for a movable segment;
a means for mounting a circuit board;
a means for segment retention;
a means for housing a circuit board;
a means for an electrical connection cavity;
a means for a light source;
a means for a circuit board;
a means for a center case segment of a tachometer case;
a means for a left case segment of the tachometer case;
a means for a right case segment of the tachometer case;
a means for a center case segment enclosure;
a means for a left case segment enclosure;
a means for a right case segment enclosure;
a means for an aperture;
wherein said means for segment retention comprises a case extension and a case slot;
the case slot, for a cavity for the case extension to insert into;
the case extension that progressively inserts into the case slot so the segments remain linked.

2. The low profile flexible light bar tachometer in accordance with claim 1, wherein said means for a movable segment comprises an internal cylindrical surface and external cylindrical surface resulting in segment movement.

3. The low profile flexible light bar tachometer in accordance with claim 1, wherein said means for mounting a circuit board comprises a circuit board mounting slot.

4. The low profile flexible light bar tachometer in accordance with claim 1, wherein said means for housing a circuit board comprises a circuit board cavity.

5. The low profile flexible light bar tachometer in accordance with claim 1, wherein said means for an electrical connection cavity comprises a right case cavity.

6. The low profile flexible light bar tachometer in accordance with claim 1, wherein said means for an electrical connection cavity comprises a left case cavity.

7. The low profile flexible light bar tachometer in accordance with claim 1, wherein said means for a light source comprises a plurality of rgb light-emitting devices.

8. The low profile flexible light bar tachometer in accordance with claim 1, wherein said means for a circuit board comprises a circuit board with the capacity to hold rgb light-emitting devices and/or electronic components and needed wiring.

9. The low profile flexible light bar tachometer in accordance with claim 1, wherein said means for a center case segment enclosure comprises a center case segment end cap incorporated into or of independent construction of said means for a center case segment.

10. The low profile flexible light bar tachometer in accordance with claim 1, wherein said means for a left case segment enclosure comprises a left case segment end cap incorporated into or of independent construction of said means for a left case segment.

11. The low profile flexible light bar tachometer in accordance with claim 1, wherein said means for a right case segment enclosure comprises a right case segment end cap incorporated into or of independent construction of said means for a right case segment.

12. The low profile flexible light bar tachometer in accordance with claim 1, wherein said means for an aperture comprises an aperture to allow transmission of light from within said means for housing a circuit board or to stabilize said means for a light source.

13. A low profile flexible light bar tachometer for displaying the rpm of an engine, comprising:
a center case segment, for a center segment of a tachometer case;
a left case segment, for a left segment of the tachometer case;

a right case segment, for a right segment of the tachometer case;
a center case segment end cap, for enclosing the end of the center case segment incorporated into or of independent construction of said center case segment;
a left case segment end cap, for enclosing the end of the left case segment incorporated into or of independent construction of said left case segment;
a right case segment end cap, for enclosing the end of the right case segment incorporated into or of independent construction of said right case segment;
an internal surface for segment rotation;
an external surface for segment rotation;
a circuit board mounting slot, for mounting a circuit board;
a case slot, for a cavity for a case extension to insert into;
a case extension that progressively inserts into said case slot so the segments remain linked;
a circuit board cavity, for housing the circuit board;
a left case cavity to hold first electrical connections;
a right case cavity to hold second electrical connections;
a plurality of rgb light-emitting devices as light source;
the circuit board, for holding said rgb light-emitting devices and third electronic components;
an aperture for said light source to transmit light through or to stabilize said light source.

* * * * *